(12) United States Patent
Snyder et al.

(10) Patent No.: US 7,262,771 B2
(45) Date of Patent: Aug. 28, 2007

(54) SYSTEMS AND METHODS FOR ALL-FREQUENCY RELIGHTING USING SPHERICAL HARMONICS AND POINT LIGHT DISTRIBUTIONS

(75) Inventors: John Michael Snyder, Redmond, WA (US); Peter-Pike Johannes Sloan, Bellevue, WA (US); Yi-Ren Ng, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 10/815,140

(22) Filed: Mar. 31, 2004

(65) Prior Publication Data

US 2005/0080602 A1 Apr. 14, 2005

Related U.S. Application Data

(60) Provisional application No. 60/510,191, filed on Oct. 10, 2003.

(51) Int. Cl.
*G06T 15/50* (2006.01)
(52) U.S. Cl. .................................... 345/426
(58) Field of Classification Search .............. None
See application file for complete search history.

(56) References Cited

U.S. PATENT DOCUMENTS

| | | | | |
|---|---|---|---|---|
| 6,664,962 B1 * | 12/2003 | Komsthoeft et al. | ........ | 345/426 |
| 6,778,189 B1 * | 8/2004 | Kilgard | ........ | 345/611 |
| 2005/0041023 A1 * | 2/2005 | Green | ........ | 345/426 |
| 2005/0041024 A1 * | 2/2005 | Green et al. | ........ | 345/426 |

OTHER PUBLICATIONS

Yoshinori Dobashi, Kazufumi Kaneda, Hideki Nakatani, Hideo Yamashita Hiroshima, Tomoyuki Nishita, "A Quick Rendering Method Using Basis Functions for Interactive Lighting Design," Aug. 1995, Computers Graphics Forum, vol. 14, No. 3.*
Ravi Ramamoorthi, Pat Hanrahan, "Frequency Space Environment Map Rendering," Jul. 2002, ACM Transactions on Graphics, vol. 21, No. 3, pp. 517-526.*
Peter-Pike Sloan, Jan Kautz, John Snyder, "Precomputed Radiance Transfer for Real-Time Rendering in Dynamic, Low-Frequency Lighting Environments," Jul. 2002, ACM Transactions on Graphics, vol. 21, No. 3, pp. 527-536.*
Cass Everitt, Mark J. Kilgard, "Practical and Robust Stenciled Shadow Volumes for Hardware-Accelerated Rendering," Mar. 12, 2002, Technical Report, NVIDIA Cooperation, Published online at developer.nvidia.com.*
Sameer Agarwal, Ravi Ramamoorthi, Serge Belongie, and Henrik Wann Jensen, "Structured Importance Sampling of Environment Maps," Jul. 2003, ACM Transactions on Graphics, vol. 22, No. 3, p. 605-612.*

(Continued)

*Primary Examiner*—Ulka Chauhan
*Assistant Examiner*—Jason M Repko
(74) *Attorney, Agent, or Firm*—Lee & Hayes, PLLC (57) ABSTRACT

Computer graphics systems and methods for all-frequency relighting are described. In one described embodiment, all-frequency relighting is achieved by representing low frequencies of lighting with spherical harmonics and approximating the residual high-frequency energy with point lights. In another embodiment low-frequencies are rendered with precomputed radiance transfer (PRT) techniques while the higher-frequencies are rendered with on-the-fly techniques.

31 Claims, 3 Drawing Sheets

OTHER PUBLICATIONS

Ren Ng, Ravi Ramamoorthi, Pat Hanrahan, "All-Frequency Shadows Using Non-Linear Wavelet Lighting Approximation," Jul. 2003, ACM Transactions on Graphics, vol. 22, No. 3, p. 376-381.*

Kautz, J. et al., "Fast, Arbitrary BRDF Shading for Low-Frequency Lighting Using Spherical Harmonics", *13 th Eurographics Workshop on Rendering*, 2002, 28, 291-296, 335, XP 002377563.

Křivanek, J. et al., "Adaptive Mesh Subdivision for Precomputed Radiance Transfer", *Proceedings of the 20th Conference on Computer Graphics*, 2004, 106-111, XP-002377559.

Lehtinen, J. et al., "Matrix Radiance Transfer", *Proceedings of the 2003 Symposium on Interactive 3d Graphics*, 2003, 59-64, 237, XP 002377562.

Sloan, P.P. et al., "Bi-Scale Radiance Transfer", *ACM Transactions on Graphics*, 2003, 22(3), 370-375, XP-002377558.

Sloan, P.P. et al., "Precomputed Radiance Transfer for Real-Time Rendering in Dynamic, Low-Frequency Lighting Environments", *Proceedings of the 29th Annual Conference on Computer Graphics and Interactive Techniques*, 2002, 21(3), 527-536, XP-002377560.

Sloan, P.P. et al., "Clustered Principal Components for Precomputed Radiance Transfer", *ACM Transactions on Graphics*, 2003, 22(2), 382-391, XP002377561.

* cited by examiner

SYSTEMS AND METHODS FOR ALL-FREQUENCY RELIGHTING USING SPHERICAL HARMONICS AND POINT LIGHT DISTRIBUTIONS

CROSS-REFERENCES

This application claims benefit of U.S. Provisional Patent Application No. 60/510,191, filed on Oct. 10, 2003, entitled "ALL FREQUENCY RELIGHTING USING SPHERICAL HARMONICS AND POINT LIGHT DISTRIBUTION," the contents of which are hereby incorporated herein by reference in their entirety.

This application is related by subject matter to the inventions disclosed in the following commonly assigned applications, the entire contents of which are hereby incorporated herein by reference: U.S. patent application Ser. No. 10/815,141, filed on even date herewith, entitled "SYSTEMS AND METHODS FOR ROBUST SAMPLING FOR REAL-TIME RELIGHTING OF OBJECTS IN NATURAL LIGHTING ENVIRONMENTS."

TECHNICAL FIELD

The present invention relates generally to the field of computer graphics, and more particularly to real-time re-lighting of computer-generated three-dimensional graphics objects existing in natural lighting environments.

BACKGROUND

All-frequency lighting generates rich visual effects that cannot be produced with current real-time relighting techniques, which are limited to very hard lights (point lighting) or very smooth lights (spherical harmonics).

Many realistic natural environments, such as detailed photographs of building interiors, contain features of all spatial frequencies, and scenes lit by such environments are enriched with subtle details in shadows and highlights. However, these effects are significantly blurred with soft harmonic lighting and become too harsh to be realistic with point lighting.

Currently the predominant technique in the art for interactive all-frequency relighting, non-linear approximation in a wavelet lighting basis (NLAWLB), is not practical because of the enormous precomputation costs and storage requirements. Therefore, what is needed is a method for all-frequency relighting that does not suffer the precomputation costs nor require the storage requirements of NLAWLB.

SUMMARY

Several embodiments of the present invention are directed to systems and methods for all-frequency relighting that use approximations based on radiance accumulation derived from a combination of real-time techniques. In this regard, certain embodiment represent low frequencies of lighting with spherical harmonics and approximate the residual high-frequency energy with point lights. One such embodiment renders low-frequencies with a tabulated rendering method such as the precomputed radiance transfer (PRT) technique (which requires only a moderate amount of precomputation and storage), while the higher-frequencies are rendered with on-the-fly techniques such as shadow maps and shadow volumes. As known and appreciated by those of skill in the art, a tabulated rendering method is one where response to lighting is pre-calculated at a plurality of surface points and represented in some form such as, for example, with a transfer matrix per point. Similarly, and on-the-fly technique is one where the shadowing and lighting effects are generated without pre-calculating or pre-storing any information as to how different points on a surface will respond to each light.

Several embodiments of the present invention are also directed to methods that utilize a precomputed radiance transfer (PRT) technique to represent high-frequency residual energy with a distribution of point lights, including but not limited to the PRT techniques disclosed by corresponding application identified in the cross-reference section earlier herein.

As is known and appreciated by those of skill in the art that, while rendering with point lights produces hard shadows and highlights, the accumulation of a set of point lights can approximate area light sources quite effectively.

In addition, various embodiments of the present invention are directed to a systems and methods for decomposing the lighting into harmonics and sets of point lights. Various alternative embodiments of the present invention are directed to systems and methods for characterizing the types of environments for which the described decomposition is a viable technique in terms of speed (efficiency) versus quality (realism).

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
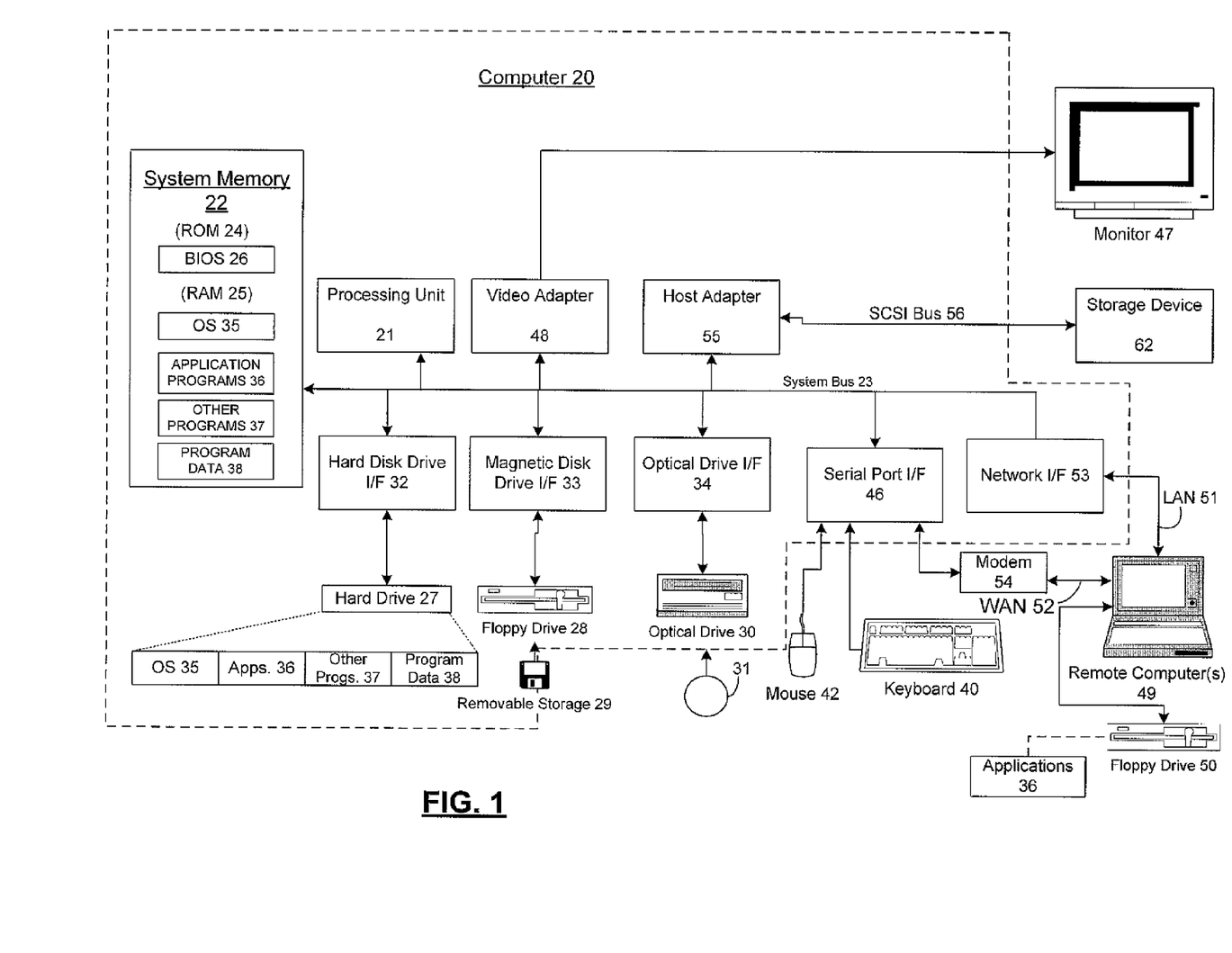
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, or mechanical.

Graphics Processing Subsystems

Figure 2:
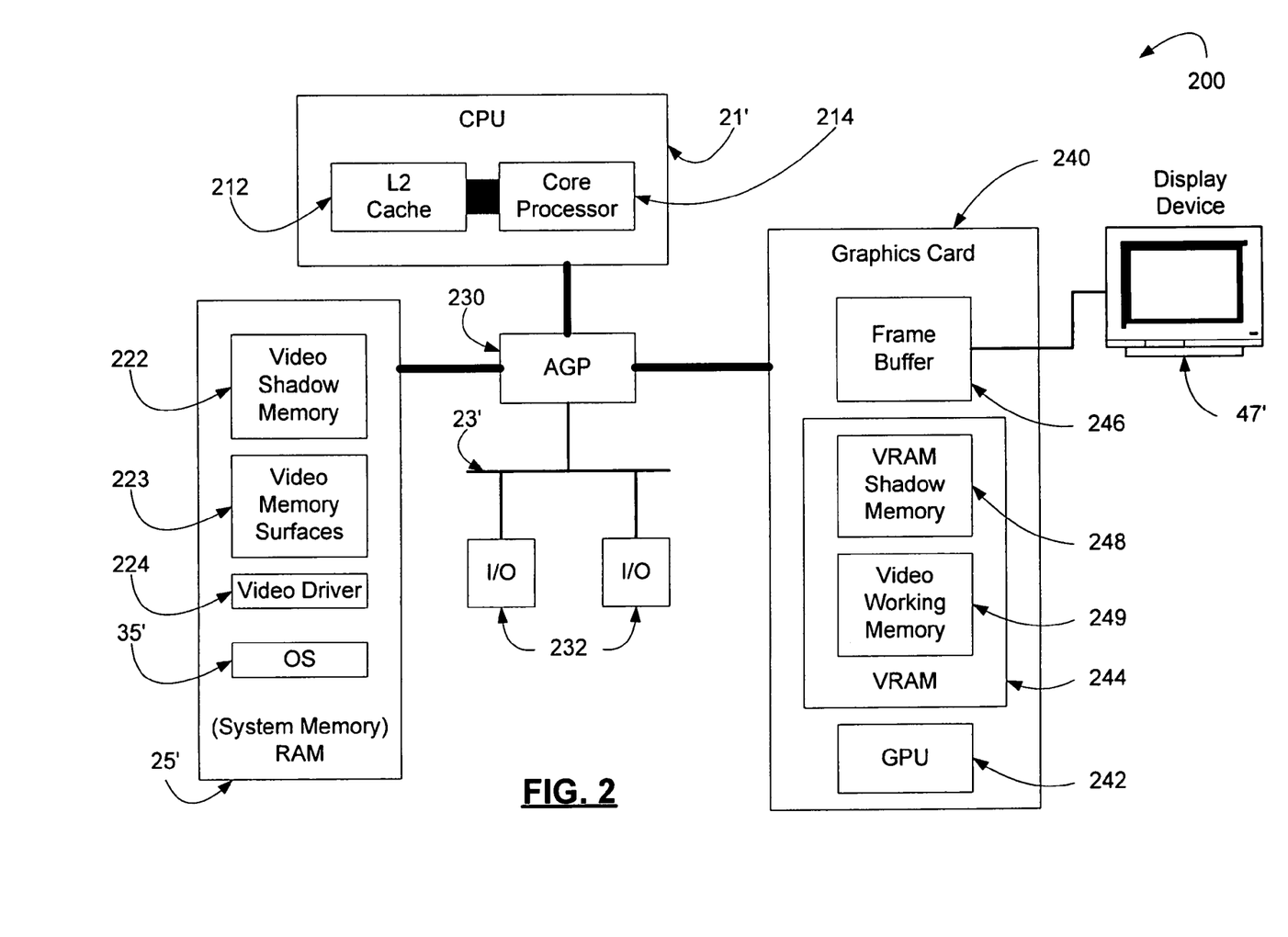
FIG. 2 is a block diagram illustrating a typical computer graphics subsystem.

FIG. 2 is a block diagram illustrating a typical computer graphics subsystem 200. The subsystem 200 comprises a CPU 21' that, in turn, comprises a core processor 214 having an on-chip L1 cache (not shown) and is further directly connected to an L2 cache 212. The L1 cache (not shown) of the CPU '21 is usually built onto the microprocessor chip itself, e.g., the Intel MMX microprocessor comes with a 32 KB L1 cache. The L2 cache 212, on the other hand, is usually on a separate chip (or possibly on an expansion card) but can still be accessed more quickly than RAM, and is usually larger than the L1 cache, e.g., one megabyte is a common size for a L2 cache. As well-known and appreciated by those of skill in the art, the CPU 21' accessing data and instructions in cache memory is much more efficient than having to access data and instructions in random access memory (RAM 25, referring to FIG. 1), and thus the CPU can achieve significant performance gains that a GPU, which lacks a cache.

The CPU 21' is connected to an AGP 230. The AGP provides a point-to-point connection between the CPU 21', the system memory RAM 25', and graphics card 240, and further connects these three components to other input/ output (I/O) devices 232—such as a hard disk drive 32, magnetic disk drive 34, network 53, and/or peripheral devices illustrated in FIG. 1—via a traditional system bus such as a PCI bus 23'. The presence of AGP also denotes that the computer system favors a system-to-video flow of data traffic—that is, that more traffic will flow from the CPU 21' and its system memory RAM 25' to the graphics card 240 than vice versa—because AGP is typically designed to up to four times as much data to flow to the graphics card 240 than back from the graphics card 240.

The graphics card 240 further comprises a frame buffer 246 which is directly connected to the display device 47'. As well-known and appreciated by those of skill in the art, the frame buffer is typically dual-ported memory that allows a processor (the GPU 242 or the CPU '21, as the case may be) to write a new (or revised) image to the frame buffer while the display device 47' is simultaneously reading from the frame buffer to refresh (or "update") the current display content. The graphics card 240 further comprises a GPU 242 and VRAM 244.

The GPU 242 is essentially a second processing unit in the computer system that has been specifically optimized for graphics operations. Depending on the graphics card, the GPU 242 may be either a graphics coprocessor or a graphics accelerator. When the graphics card is a graphics coprocessor, the video driver 224 sends graphics-related tasks directly to the graphics coprocessor for execution, and the graphics coprocessor alone render graphics for the frame buffer 246 (without direct involvement of the CPU 21'). On the other hand, when a graphics cards is a graphics accelerator, the video driver 224 sends graphics-related tasks to the CPU 21' and the CPU 21' then directs the graphics accelerator to perform specific graphics-intensive tasks. For example, the CPU 21' might direct the graphics accelerator to draw a polygon with defined vertices, and the graphics accelerator would then execute the tasks of writing the pixels of the polygon into video memory (the VRAMSM 248) and, from there, copy the updated graphic to the frame buffer 246 for display on the display device 47'.

Accompanying the GPU 242 is VRAM 244 that enables the GPU to maintain its own shadow memory (the VRAMSM) close at hand for speedy memory calls (instead of using RAM), and may also provide additional memory (e.g, VWM) necessary for the additional processing operations such as the GPU Method. The VRAM 244 further comprises a VRAMSM 248 and VWM 249. The VRAMSM 248 is the location in VRAM 244 where the GPU 242 constructs and revises graphic images (including CIs in the GPU Method), and it is the location from which the GPU 242 copies rendered graphic images to the frame buffer 246 of the graphics card 240 to update the display device 47'. In the GPU Method, the VWM is an additional area of VRAM that is used by the GPU 242 to temporarily store graphics data that might be used by the GPU 242 to store GOs and/or store/restore POs (or portions thereof) among other things. (By offloading this functionality to the graphics card 240, the CPU 21' and VSM 222 are freed from these tasks.)

The system memory RAM 25' may comprise the operating system 35', a video driver 224, video memory surfaces (VMSs) 223, and video shadow memory (VSM) 222. The VSM is the location in RAM 25' where the CPU 21' constructs and revises graphic images (including CIs in the CPU Method) and from where the CPU 21' copies rendered graphic images to the frame buffer 246 of the graphics card 240 via the AGP 230. In the CPU Method, the VMSs are additional areas of RAM that are used by the CPU 21' to temporarily store graphics data that might be used by the CPU 21' to store GOs and/or store/restore POs (or portions thereof) among other things.

All-Frequency Lighting

Traditional ways to represent area lights with points have focused on sets of points that produce still images of acceptable quality, such as by using importance-based metrics that are weighted by the size of the light being approximated. These techniques tend to quantify the size of regions in environment maps with a segmentation technique based on simple lighting intensity stratification. However, since the rendering primitive—that is, rendering with a harsh point light—is inherently localized, very large sets are required in general. Regardless of the importance-based metric employed, several hundred lights are generally needed to represent general environment maps for specific scenes, and generally no less than one hundred points are required to approximate a small area light. For this reason, the broad use of point lights is too expensive for current real-time applications.

The methodology employed by several embodiments of the present invention reduce the number of number of point lights required by extracting the low spatial frequencies with spherical harmonics—that is, the frequencies that correspond to the largest areas of energy and which typically carry the highest sampling requirements. This approach, in turn, effectively reduces the number of lights needed since the largest area regions—which usually require the largest numbers of samples for reasonable approximation—will be well approximated by the spherical harmonics. The method segments the environment into regions based on intensity and spatial connectedness, and each of these regions is approximated with some number of point samples per pixel.

Figure 3:
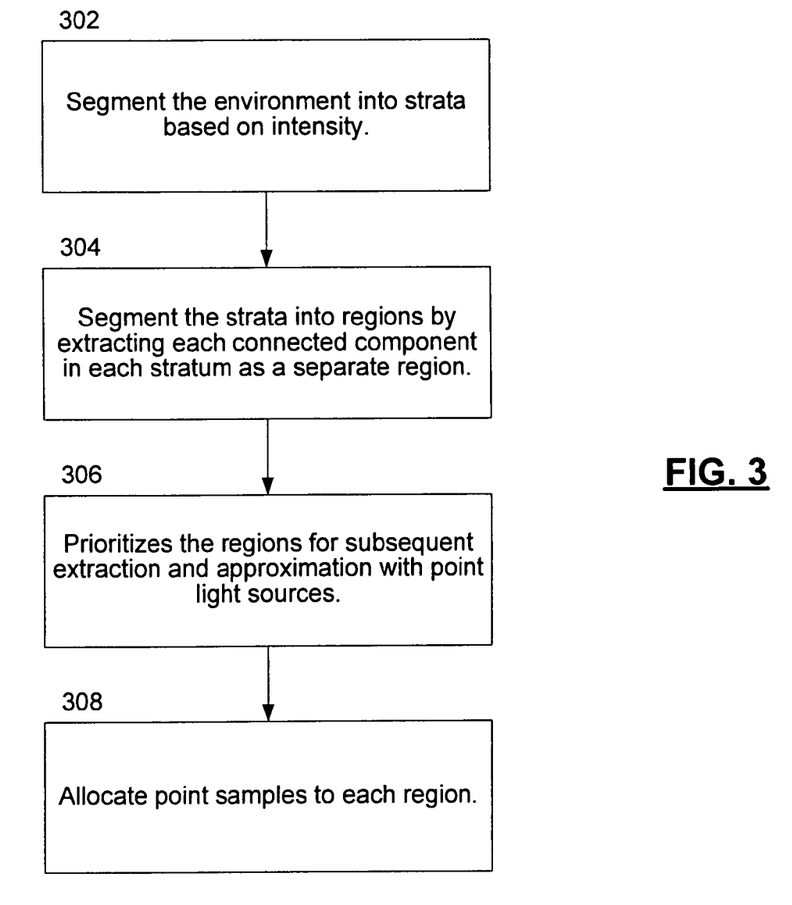
FIG. 3 is a flow chart illustrating the steps of the method for all-frequency relighting using spherical harmonics and point light distributions.

FIG. 3 is a flow chart illustrating the steps of the method for all-frequency relighting using spherical harmonics and point light distributions, said method described in detail hereinafter.

The first step of the method, step 302, is to segment the environment into strata based on intensity. This may be accomplished by extracting a certain, predefined number of strata with a nearest-intensity, iterative clustering algorithm. This is somewhat different than existing approaches such as, for example, those that partition the dynamic range uniformly into six ranges—the first five corresponding to the first five standard deviations of the signal, the sixth containing the high energy remainder—and groups pixels into each of these six ranges. Though these existing approaches obtain good results in test scenarios, the underlying methodology neglects the fact that many measured environments contain very large dynamic ranges and are probably not well approximated by a normal distribution. In contrast, the present method is instead based on the k-nearest neighbor learning algorithm which is likely to be more robust at stratifying points into well-formed intensity ranges.

The second step, step 304, is to segment the strata into regions by extracting each connected component in each stratum as a separate region. In alternative embodiments, this may also include attempting to group small, neighboring components into single regions.

The third step, step 306, is to prioritizes the regions for subsequent extraction and approximation with small analytic light sources, including without limitation point light sources, small square light sources, and small circular light sources. Of course, there may be several potentially conflicting factors affecting the importance of a region but, in general, regions that extract more high-frequency energy are more important because they contribute more to the outgoing image. Therefore, for this reason, certain embodiments will tend to select smaller regions first because they require fewer samples to be represented well. In any event, several general approaches to determining importance may be employed, including but not limited to: (a) importance based on high-frequency energy reduction (HFER); (b) importance based on iterative algorithm for background estimation (IABE); and (c) the "contrast technique." Specific examples for each of these techniques is discussed in further detail herein below.

The fourth step, step 308, is to allocate point samples to each region. In this regard, each region is represented with one point sample per pixel before proceeding to the next region, and such regions are chosen until either (a) there are none left to choose or (b) there are no more samples with which to approximate. This approach ensures that each lighting feature is well resolved as it is chosen for inclusion, although it also means that few samples will result in the loss of entire regions. In alternative embodiments, additional noise in all regions may be acceptable if all regions with a minimum number of samples are included. In this regard, additional samples may be added as available to reduce noise in the most critical regions. If temporal jittering successfully turns light reconstruction aliasing into temporal noise, then this solution may be a more principled approach, and thus adding more samples may reduce the noise of the time-integrated output penumbra regions whereas too few samples means unacceptably high temporal noise.

Priority/Importance Techniques

As mentioned earlier herein, various embodiments of the present invention may employ one or more general techniques for determining importance, including without limitation the following specific technique examples:

Importance Based on High-frequency Energy Reduction (HFER):

Let $p_i$ for i from 1 to N be the pixels within the region of interest. Let $L[p_i]$ be the value of the original signal at pixel i. Let $SH_n(L)$ be the low pass signal obtained by projecting L onto the first n degree spherical harmonics. Furthermore, define the residual high pass signal as follows:

$$HP_n(L) = L - SH_n(L)$$

With these definitions, the HFER importance metric for the region of interest is:

$$\frac{1}{N} \sum_{i=1}^{N} (HP_n(L)[p_i])^2$$

This particular metric measures the average reduction in high pass energy over the region. On careful inspection, the method favors smaller regions because of the fact that it measure average reduction, whereas larger regions of the same intensity will have more energy taken out of the high pass signal and hence the average reduction will be lower.

Importance Based on Iterative Algorithm for Background Estimation (IABE):

The HFER metric assumes that the background value is given by the values of the low pass projection. In certain instances, this has the disadvantage of smearing the energy of a high energy peak into the pixels that surround the peak, and such smearing may be undesirable for at least two reasons: (a) it may cause an overestimation of the background value for dark pixels neighboring a bright peak; and (b) it may overestimate the background underneath the peak itself.

An alternative solution is an iterative algorithm (the IABE) that simultaneously extracts peak energy and estimates the background value. At each step of the iteration, the method estimates the value of the background for each pixel to be the value of the low pass filtering of the original signal minus the current estimate of the peaks. The system then updates the estimate of the peaks as the difference between the original signal and the current background estimate.

More precisely, the method first assumes that the input lighting signal L will be represented as the sum of a bandlimited signal LSH and a signal based on the sum of point light distributions, $L_P$ as follows:

$$L \approx L_{SH} + L_P$$

In addition, let $L_{SH}^k$ and $L_P^k$ be the low pass and point distribution signal chosen at iteration k. In particular, $$L_P^k = \sum_{i=1}^{k} SQ(p_i) \cdot I_i^k$$

where $SQ(p_i)$ is an indicator function for inclusion in the pixel of point i, and $I_i^k$ is the chosen intensity of the peak at $p_i$. Then the iterative algorithm of the method is defined by recursive updates of the low pass signal and peak intensities as follows:

$$L_{SH}^0 = SH_n(L)$$
$$I_i^0 = (L - SH_n(L))[p_i]$$
$$L_{SH}^k = SH_n(L - L_P^{k-1})$$
$$I_i^k = (L - L_{SH}^k)[p_i]$$

Thus the modified importance metric for the region of interest is as follows:

$$\frac{1}{N} \sum_{i=1}^{N} (L_P[p_i])^2$$

Importance Based on Contrast:

Another potential drawback of the IABE importance metric defined above is that it does not account for the perceptual effect that a dark, localized region in a bright field, although this is not as important to resolve as a bright localized region in a dark field. Whereas the former generates an image with flat lighting and small amount of illumination subtracted, the latter generates a stark image where the bright region may cast strong shadows. In any event, one way to alleviate this problem (and to discriminate between the two cases described above in the correct way) would be to modify the metric to take into account the contrast of the pixels in the region relative to the background rather than just high frequency reduction. Thus a further refinement of the importance for the region of interest, based on the IABE technique, is as follows (referred to herein simply as the "contrast technique"):

$$\frac{1}{N}\sum_{i=1}^{N}\left(\frac{L_P[p_i]}{L_{SH}[p_i]}\right)^2$$

CONCLUSION

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A method for displaying all-frequency relighting of computer-generated graphic objects, comprising:
   using approximations based on an radiance accumulation derived from a combination of at least two real-time techniques;
   representing a set of low frequencies of lighting with a tabulated rendering method;
   approximating high-frequency energy with an on-the-fly method;
   segmenting a lighting environment into a plurality of regions;
   prioritizing each of the plurality of regions for subsequent extraction and approximation with a plurality of small analytic light sources, wherein said element of prioritizing each of the plurality of regions for subsequent extraction and approximation with point light sources comprises high-frequency energy reduction;
   allocating one or more point samples to each of said plurality of regions; and
   displaying the computer-generated graphic objects.

2. The method of claim 1 wherein a set of low frequencies of lighting are represented with a precomputed radiance transfer (PRT) technique and high-frequency energy is approximated with a plurality of point lights.

3. The method of claim 1 wherein a set of low frequencies of lighting is rendered using a spherical harmonics technique.

4. The method of claim 1 wherein a set of high frequencies of lighting is rendered using a shadow map technique.

5. The method of claim 1 wherein a set of high frequencies of lighting is rendered using a shadow volumes technique.

6. A system for displaying all-frequency relighting of computer-generated graphic objects, comprising:
   a subsystem for determining approximations based on an radiance accumulation derived from a combination of at least two real-time techniques;
   a subsystem for representing a set of low frequencies of lighting with a tabulated rendering method;
   a subsystem for approximating high-frequency energy using an on-the-fly method;
   a subsystem for segmenting a lighting environment into a plurality of regions;
   a subsystem for prioritizing each of the plurality of regions for subsequent extraction and approximation with a plurality of small analytic light sources, wherein said subsystem for prioritizing each of the plurality of regions for subsequent extraction and approximation with point light sources utilizes a high-frequency energy reduction technique;
   a subsystem for allocating one or more point samples to each of said plurality of regions; and
   a subsystem for displaying the computer-generated graphic objects.

7. The system of claim 6 further comprising a subsystem for representing a set of low frequencies of lighting with precomputed radiance transfer (PRT) and a subsystem for approximating high-frequency energy with a plurality of point lights.

8. The system of claim 7 further comprising a subsystem using a spherical harmonics technique to render a set of low frequencies of lighting.

9. The system of claim 7 further comprising a subsystem using a shadow map technique to render a set of high frequencies of lighting.

10. The system of claim 7 further comprising a subsystem using a shadow volumes technique to render a set of high frequencies of lighting.

11. A computer-readable medium storing computer-readable instructions for displaying all-frequency relighting of computer-generated graphic objects, said computer readable instructions comprising instructions for:
   using approximations based on an radiance accumulation derived from a combination of at least two real-time techniques;
   representing a set of low frequencies of lighting with a tabulated rendering method;
   approximating high-frequency energy with an on-the-fly method;
   segmenting a lighting environment into a plurality of regions;
   prioritizing each of the plurality of regions for subsequent extraction and approximation with a plurality of small analytic light sources, whereby said element of prioritizing each of the plurality of regions for subsequent extraction and approximation with point light sources comprises high-frequency energy reduction;
   allocating one or more point samples to each of said plurality of regions; and
   displaying the computer-generated graphic objects.

12. The computer-readable instructions of claim 11 further comprising instructions whereby a set of low frequencies of lighting are represented with a precomputed radiance transfer (PRT) technique and high-frequency energy is approximated with a plurality of point lights.

13. The computer-readable instructions of claim 12 further comprising instructions whereby a set of low frequencies of lighting is rendered using a spherical harmonics technique.

14. The computer-readable instructions of claim 12 further comprising instructions whereby a set of high frequencies of lighting is rendered using a shadow map technique.

15. The computer-readable instructions of claim 12 further comprising instructions whereby a set of high frequencies of lighting is rendered using a shadow volumes technique.

16. A hardware control device for displaying all-frequency relighting of computer-generated graphic objects using approximations based on an radiance accumulation derived from a combination of at least two real-time techniques, said device comprising:
   means by which a set of low frequencies of lighting are represented with a precomputed radiance transfer (PRT) technique and high-frequency energy is approximated with a plurality of point lights;
   means by which a set of high frequencies of lighting is rendered using one of a set of techniques, said set of techniques comprising: a shadow map technique, and a shadow volumes technique
   means for segmenting a lighting environment into a plurality of strata regions;
   means for prioritizing each of the plurality of regions for subsequent extraction and approximation with a plurality of small analytic light sources, wherein said means for prioritizing each of the plurality of regions for subsequent extraction and approximation with point light sources comprises means employing a technique based on one of the following sets of techniques: a high-frequency energy reduction technique or an iterative algorithm for a background estimation technique;
   means for allocating one or more point samples to each of said plurality of regions; and
   means for displaying the computer-generated graphic objects.

17. A method for displaying all-frequency relighting of computer-generated graphic objects, comprising:
   using approximations based on an radiance accumulation derived from a combination of at least two real-time techniques;
   representing a set of low frequencies of lighting with a tabulated rendering method;
   approximating high-frequency energy with an on-the-fly method;
   segmenting a lighting environment into a plurality of regions;
   prioritizing each of the plurality of regions for subsequent extraction and approximation with a plurality of small analytic light sources, wherein said element of prioritizing each of the plurality of regions for subsequent extraction and approximation with point light sources comprises an iterative algorithm for a background estimation;
   allocating one or more point samples to each of said plurality of regions; and
   displaying the computer-generated graphic objects.

18. The method of claim 17 wherein a set of low frequencies of lighting are represented with a precomputed radiance transfer (PRT) technique and high-frequency energy is approximated with a plurality of point lights.

19. The method of claim 18 wherein a set of low frequencies of lighting is rendered using a spherical harmonics technique.

20. The method of claim 18 wherein a set of high frequencies of lighting is rendered using a shadow map technique.

21. The method of claim 18 wherein a set of high frequencies of lighting is rendered using a shadow volumes technique.

22. A system for displaying all-frequency relighting of computer-generated graphic objects, comprising:
   a subsystem for determining approximations based on an radiance accumulation derived from a combination of at least two real-time techniques;
   a subsystem for representing a set of low frequencies of lighting with a tabulated rendering method;
   a subsystem for approximating high-frequency energy using an on-the-fly method;
   a subsystem for segmenting a lighting environment into a plurality of regions;
   a subsystem for prioritizing each of the plurality of regions for subsequent extraction and approximation with a plurality of small analytic light sources, wherein said subsystem for prioritizing each of the plurality of regions for subsequent extraction and approximation with point light sources utilizes an iterative algorithm for a background estimation technique;
   a subsystem for allocating one or more point samples to each of said plurality of regions; and
   a subsystem for displaying the computer-generated graphic objects.

23. The system of claim 22 further comprising a subsystem for representing a set of low frequencies of lighting with precomputed radiance transfer (PRT) and a subsystem for approximating high-frequency energy with a plurality of point lights.

24. The system of claim 23 further comprising a subsystem using a spherical harmonics technique to render a set of low frequencies of lighting.

25. The system of claim 23 further comprising a subsystem using a shadow map technique to render a set of high frequencies of lighting.

26. The system of claim 23 further comprising a subsystem using a shadow volumes technique to render a set of high frequencies of lighting.

27. A computer-readable medium storing computer-readable instructions for displaying all-frequency relighting of computer-generated graphic objects, said computer readable instructions comprising instructions for:

using approximations based on an radiance accumulation derived from a combination of at least two real-time techniques;

representing a set of low frequencies of lighting with a tabulated rendering method;

approximating high-frequency energy with an on-the-fly method;

segmenting a lighting environment into a plurality of regions;

prioritizing each of the plurality of regions for subsequent extraction and approximation with a plurality of small analytic light sources, whereby said element of prioritizing each of the plurality of regions for subsequent extraction and approximation with point light sources comprises an iterative algorithm for a background estimation;

allocating one or more point samples to each of said plurality of regions; and displaying the computer-generated graphic objects.

28. The computer-readable instructions of claim 27 further comprising instructions whereby a set of low frequencies of lighting are represented with a precomputed radiance transfer (PRT) technique and high-frequency energy is approximated with a plurality of point lights.

29. The computer-readable instructions of claim 28 further comprising instructions whereby a set of low frequencies of lighting is rendered using a spherical harmonics technique.

30. The computer-readable instructions of claim 28 further comprising instructions whereby a set of high frequencies of lighting is rendered using a shadow map technique.

31. The computer-readable instructions of claim 28 further comprising instructions whereby a set of high frequencies of lighting is rendered using a shadow volumes technique.

* * * * *